United States Patent
Noguchi et al.

(10) Patent No.: US 8,765,236 B2
(45) Date of Patent: Jul. 1, 2014

(54) RECORDING MEDIUM

(71) Applicant: Canon Kabushiki Kaisha, Tokyo (JP)

(72) Inventors: Tetsuro Noguchi, Hachioji (JP); Hisao Kamo, Ushiku (JP); Isamu Oguri, Yokohama (JP); Shinya Yumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/842,831

(22) Filed: Mar. 15, 2013

(65) Prior Publication Data
US 2013/0266747 A1    Oct. 10, 2013

(30) Foreign Application Priority Data
Apr. 5, 2012 (JP) ................. 2012-086534

(51) Int. Cl.
| | |
|---|---|
| *B41M 5/00* | (2006.01) |
| *B41M 5/50* | (2006.01) |
| *B41M 5/52* | (2006.01) |
| *C04B 41/52* | (2006.01) |
| *C08F 222/10* | (2006.01) |

(52) U.S. Cl.
CPC ............. *B41M 5/506* (2013.01); *B41M 5/5218* (2013.01); *B41M 5/5254* (2013.01); *B41M 5/52* (2013.01); *B41M 5/502* (2013.01); *C04B 41/52* (2013.01); *C08F 222/1006* (2013.01); *C09K 2211/1022* (2013.01)
USPC ................. 428/32.24; 428/32.25; 428/32.29; 428/32.38; 428/704; 427/243

(58) Field of Classification Search
CPC .. B41M 5/506; B41M 5/5218; B41M 5/5254; B41M 5/52; B41M 5/502; C08F 222/1006; C09K 2211/1022; C04B 41/52
USPC ............. 428/32.24, 32.25, 32.29, 32.38, 704; 427/243
See application file for complete search history.

(56) References Cited

U.S. PATENT DOCUMENTS

| | | | | |
|---|---|---|---|---|
| 6,177,177 | B1 * | 1/2001 | Herrmann et al. | 428/212 |
| 2002/0094420 | A1 * | 7/2002 | Hatano et al. | 428/195 |
| 2003/0137571 | A1 * | 7/2003 | Friedel et al. | 347/101 |
| 2008/0107843 | A1 * | 5/2008 | Burch et al. | 428/32.3 |
| 2008/0241438 | A1 | 10/2008 | Nakano et al. | |

FOREIGN PATENT DOCUMENTS

| | | |
|---|---|---|
| EP | 2020304 A1 | 2/2009 |
| JP | 2001-341418 A | 12/2001 |
| JP | 2004-262232 A | 9/2004 |
| JP | 2005-280035 A | 10/2005 |

\* cited by examiner

*Primary Examiner* — Betelhem Shewareged

(74) *Attorney, Agent, or Firm* — Canon U.S.A., Inc., IP Division

(57) ABSTRACT

A recording medium includes a base, a second ink-receiving layer, and a first ink-receiving layer in this order. The first ink-receiving layer contains gas-phase method silica, a binder, a cationic polymer having a sulfonyl group, and glycol. The second ink-receiving layer contains gas-phase method silica and a binder and (1) does not contain any cationic polymer having a sulfonyl group or (2) contains a cationic polymer having a sulfonyl group in an amount not higher than 0.1 parts by mass based on 100 parts by mass of the gas-phase method silica.

7 Claims, 1 Drawing Sheet

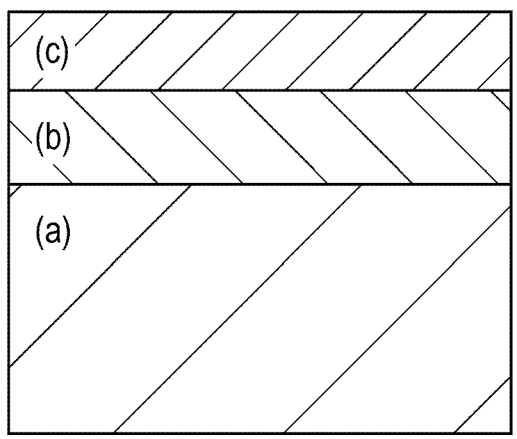

RECORDING MEDIUM

BACKGROUND OF THE INVENTION

1. Field of the Invention

The present invention relates to a recording medium.

2. Description of the Related Art

Silica can form a porous structure showing high ink-absorbing properties and is therefore suitable as inorganic particles that are used in the ink-receiving layer of a recording medium. In general, silica is roughly classified based on the production process into wet method and dry method (gas-phase method). In particular, the silica prepared by the dry method (gas-phase method) (hereinafter, also referred to as "gas-phase method silica") has a particularly large specific surface area and thereby shows particularly high ink-absorbing properties. In addition, the silica has a low refractive index and thereby makes the transparency of the ink-receiving layer high to give good color development of an image.

Japanese Patent Laid-Open No. 2001-341418 discloses a method of enhancing the ozone resistance of an image by a recording medium having an ink-receiving layer containing such gas-phase method silica. This Patent Literature describes an improvement in the ozone resistance of an image by an ink-receiving layer containing an amino compound having repeating alkylene oxide groups and a diallylamine hydrochloride-sulfur dioxide copolymer as a cationic polymer, in addition to gas-phase method silica and polyvinyl alcohol as a binder.

Japanese Patent Laid-Open Nos. 2005-280035 and 2004-262232 describe improvements in the bleed resistance and color development of an image by a recording medium having an ink-receiving layer prepared by laminating a finish coat layer containing a cationic polymer on an undercoat layer containing a pigment and a binder.

However, according to the investigation by the present inventors, though the ozone resistance of an image is improved in the recording medium described in Japanese Patent Laid-Open No. 2001-341418, cracking occurs in the ink-receiving layer. In Japanese Patent Laid-Open No. 2005-280035, since gas-phase method silica is not used, the intended color development of an image is not obtained. In Japanese Patent Laid-Open No. 2004-262232, though gas-phase method silica is used, a bronze phenomenon occurs in the resulting image.

SUMMARY OF THE INVENTION

The present invention provides a recording medium, in which cracking of the ink-receiving layer thereof is prevented from occurring, the ozone resistance of a resulting image is high, and a bronze phenomenon is suppressed.

The recording medium according to the present invention includes a base, a second ink-receiving layer, and a first ink-receiving layer in this order, wherein the first ink-receiving layer contains gas-phase method silica, a binder, a cationic polymer having a sulfonyl group, and glycol; and the second ink-receiving layer contains gas-phase method silica and a binder and does not contain (1) any cationic polymer having a sulfonyl group or contains (2) a considerably small amount of a cationic polymer having a sulfonyl group, i.e., in an amount not higher than 0.1 parts by mass based on 100 parts by mass of the gas-phase method silica.

According to the present invention, a recording medium, in which cracking of the ink-receiving layers thereof is prevented from occurring, the ozone resistance of a resulting image is high, and a bronze phenomenon is suppressed, is provided.

Further features of the present invention will become apparent from the following description of exemplary embodiments with reference to the attached drawing.

BRIEF DESCRIPTION OF THE DRAWINGS

FIG. 1 is a schematic diagram illustrating an example of the structure of a recording medium according to the present invention.

DESCRIPTION OF THE EMBODIMENTS

The present invention will now be described in detail by embodiments. The present inventors investigated various compounds and have found that the ozone resistance of an image is improved by an ink-receiving layer containing a cationic polymer having a sulfonyl group. This is believed to be caused by that in the cationic polymer having a sulfonyl group; the electron density of the cationic groups is reduced due to the electron-withdrawing sulfonyl group to strengthen the association with the coloring material. However, it was revealed that the cationic polymer having a sulfonyl group decreases the viscosity of coating solution to readily cause cracking in the ink-receiving layer in drying thereof. Accordingly, the present inventors have performed investigation and have revealed that the cracking of the ink-receiving layer is inhibited and the ozone resistance of an image is enhanced in the structure of the present invention, that is, when the ink-receiving layer includes a second ink-receiving layer (hereinafter, also simply referred to as "second layer") and a first ink-receiving layer (hereinafter, also referred to as "first layer") in this order from the base side; the first layer contains a cationic polymer having a sulfonyl group; and the second layer does not contain (1) any cationic polymer having a sulfonyl group or contains (2) a considerably small amount of a cationic polymer having a sulfonyl group, i.e., in an amount not higher than 0.1 parts by mass based on 100 parts by mass of gas-phase method silica. Furthermore, the first layer contains glycol and thereby prevents a bronze phenomenon from being readily caused by the cationic polymer having a sulfonyl group.

Recording Medium

Each component constituting the recording medium of the present invention will now be described.

Ink-Receiving Layer

The ink-receiving layer of the recording medium according to the present invention contains gas-phase method silica and a binder and is composed of a second layer not containing any cationic polymer having a sulfonyl group and a first layer containing a cationic polymer having a sulfonyl group in this order from the base side. The structure of the ink-receiving layer according to the present invention will be described with reference to FIG. 1. In FIG. 1, the reference sign (a) denotes the base, the reference sign (b) denotes the second layer, and the reference sign (c) denotes the first layer. In the present invention, another layer may be disposed on the first layer and/or between the first layer and the second layer.

In the present invention, the thickness of the ink-receiving layer (the total thickness of layers (b) and (c) in FIG. 1) can be 20 µm or more and 50 µm or less, in particular, 30 µm or more and 45 µm or less, from the viewpoint of the ink-absorbing properties. The thickness of the ink-receiving layer is determined by measuring thicknesses of at least five points of a cross section of the recording medium with a scanning electron microscope (SEM) and calculating the average thereof.

First Layer

In the present invention, the first layer of the ink-receiving layer contains a cationic polymer having a sulfonyl group. The thickness of the first layer (the thickness of layer (c) in FIG. 1) can be 5 μm or more and 30 μm or less, in particular, 10 μm or more and 25 μm or less. When the thickness of the first layer is smaller than 10 μm, the effect of improving the ozone resistance of an image may be insufficient, and when the thickness is larger than 25 μm, the effect of inhibiting occurrence of cracking of the ink-receiving layer may be insufficient.

In the present invention, the first layer can be present within 5 μm from the outermost surface of the ink-receiving layer, from the viewpoint of improving the ozone resistance of an image.

Second Layer

In the present invention, the second layer of the ink-receiving layer does not contain (1) any cationic polymer having a sulfonyl group or contains (2) a considerably small amount of a cationic polymer having a sulfonyl group, i.e., in an amount not higher than 0.1 parts by mass based on 100 parts by mass of the gas-phase method silica. The thickness of the second layer (the thickness of layer (b) in FIG. 1) can be 10 μm or more and 35 μm or less from the viewpoint of inhibiting occurrence of cracking of the ink-receiving layer. In the present invention, all of the layers of the ink-receiving layer other than the first layer may have the same structure as that of the second layer.

Each component constituting the ink-receiving layer will now be described.

Gas-Phase Method Silica

In the present invention, the ink-receiving layer contains gas-phase method silica in both the first layer and the second layer. The gas-phase method silica can be prepared by, for example, preparation of anhydrous silica by high-temperature gas-phase hydrolysis of halogenated silicon (flame hydrolysis) or by thermal reduction-vaporization of silica sand and coke through arcing in an electric furnace and oxidation the resulting product with air (arc process). Specific examples of the gas-phase method silica include Aerosil (manufactured by Nippon Aerosil Co., Ltd.) and Reolosil QS type (manufactured by Tokuyama Corporation).

In the present invention, the gas-phase method silica can have a specific surface area (by the BET method) of 50 $m^2/g$ or more and 400 $m^2/g$ or less, in particular, 200 $m^2/g$ or more and 350 $m^2/g$ or less.

In the present invention, the content (mass %) of the gas-phase method silica in the ink-receiving layer can be 50 mass % or more and 98 mass % or less, in particular, 70 mass % or more and 96 mass % or less.

In the present invention, the application amount ($g/m^2$) of the gas-phase method silica in the formation of the ink-receiving layer can be 8 $g/m^2$ or more, in particular, 10 $g/m^2$ or more and 30 $g/m^2$ or less. An application amount of less than 10 $g/m^2$ may provide insufficient ink-absorbing properties, and an application amount of higher than 30 $g/m^2$ may cause cracking during drying in the production of a recording medium.

In the present invention, the gas-phase method silica can have an average primary particle diameter of 1 nm or more and 1 μm or less, in particular, 30 nm or less. The average primary particle diameter can be 3 nm or more and 10 nm or less. In the present invention, the average primary particle diameter of the gas-phase method silica is the number-average particle diameter of the diameters of circles having the same areas as projected areas of primary particles of the gas-phase method silica observed by an electron microscope. On this occasion, the measurement is performed for at least 100 points.

Binder

In the present invention, the ink-receiving layer contains a binder in both the first layer and the second layer. The binder may be any material that can bind the gas-phase method silica and can form a coat and does not impair the effects of the present invention.

Examples of the binder include starch derivatives such as oxidized starch, esterified starch, and phosphorylated starch; cellulose derivatives such as carboxymethyl cellulose and hydroxyethyl cellulose; casein, gelatin, soybean protein, polyvinyl alcohol (PVA), and derivatives thereof; various polymers such as polyvinylpyrrolidone and maleic anhydride resins and conjugated polymer latex such as styrene-butadiene copolymers and methyl methacrylate-butadiene copolymers; acrylic polymer latex such as polymers of acrylate and methacrylate; vinyl polymer latex such as ethylene-vinyl acetate copolymers; functional group-modified polymer latex of the above-mentioned various polymers of monomers containing functional groups such as carboxyl groups; the above-mentioned polymers cationized with cationic groups and the above-mentioned polymers of which surfaces are cationized with cationic surfactants; the above-mentioned polymers polymerized in the presence of cationic polyvinyl alcohol so as to distribute the polyvinyl alcohol on the polymer surfaces; the above-mentioned polymers polymerized in a suspension/dispersion of cationic colloidal particles so as to distribute the cationic colloidal particles on the polymer surfaces; aqueous binders such as thermosetting synthetic resins, e.g., melamine resins and urea resins; polymer and copolymer resins of methacrylate and acrylate such as poly(methyl methacrylate); and synthetic resin binders such as polyurethane resins, unsaturated polyester resins, vinyl chloride-vinyl acetate copolymers, polyvinyl butyral, and alkyd resins. These binders may be used alone or in a combination of two or more thereof, as necessary.

Among the above-mentioned binders, polyvinyl alcohol (PVA) and polyvinyl alcohol derivatives can be particularly used. Examples of the polyvinyl alcohol derivative include cation-modified polyvinyl alcohol, anion-modified polyvinyl alcohol, silanol-modified polyvinyl alcohol, and polyvinyl acetal. The PVA can be synthesized by hydrolysis (saponification) of polyvinyl acetate. The degree of saponification of the PVA can be 80 mol % or more and 100 mol % or less, in particular, 85 mol % or more and 100 mol % or less. The degree of saponification is the ratio of the molar number of hydroxyl groups generated by saponification of polyvinyl acetate to polyvinyl alcohol, and is a value measured by the method described in JIS-K6726. In addition, the PVA can have an average polymerization degree of 1500 or more, in particular, 2000 or more and 5000 or less. Incidentally, the average polymerization degree herein is the average polymerization degree determined by the method described in JIS-K6726 (1994).

In the present invention, the content of the gas-phase method silica contained in the ink-receiving layer of the recording medium can be three to twenty times the content of the binder, in terms of mass ratio.

Crosslinking Agent

In the present invention, the ink-receiving layer may contain a crosslinking agent. Examples of the crosslinking agent include aldehyde compounds, melamine compounds, isocyanate compounds, zirconium compounds, amide compounds, aluminum compounds, boric acids, and boric acid salts.

These crosslinking agents can be used alone or in a combination of two or more thereof, as necessary. Among the above-mentioned crosslinking agents, boric acids and boric acid salts have a notable effect of inhibiting cracking of the ink-receiving layer and can be particularly used.

Examples of the boric acid include orthoboric acid ($H_3BO_3$), metaboric acid, and diboric acid. The boric acid salt can be any of water-soluble salts of these boric acids, and examples of the boric acid salt include alkali metal salts of boric acids such as sodium salts and potassium salts of boric acids; alkaline earth metal salts of boric acids such as magnesium salts and calcium salts of boric acids; and ammonium salts of boric acids. Among these boric acids and boric acid salts, orthoboric acid has notable effects of stabilizing the coating solution for a long time and inhibiting cracking and can be particularly used.

The amount of the boric acid or boric acid salt can be appropriately selected depending on, for example, the production conditions. The content of the boric acid or boric acid salt can be 5.0 mass % or more and 50.0 mass % or less relative to the content of the binder contained in the ink-receiving layer.

Cationic Polymer Having a Sulfonyl Group

In the present invention, the first layer of the ink-receiving layer contains a cationic polymer having a sulfonyl group. The cationic polymer having a sulfonyl group can be prepared by copolymerization of a cationic monomer, such as diallylamine hydrochloride, methyldiallylamine hydrochloride, or diallyldimethylammonium chloride, with sulfur dioxide. Specific examples of the cationic polymer having a sulfonyl group include compounds represented by the following Formula (1) and compounds represented by the following Formula (2):

[Chem. 1]

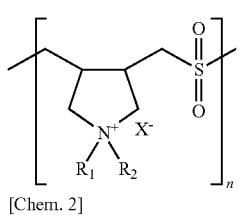

Formula (1)

[Chem. 2]

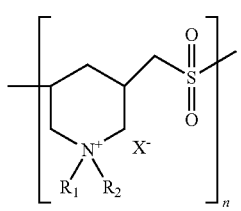

Formula (2)

(in Formulae (1) and (2), $R_1$ and $R_2$ each represent a hydrogen atom or an alkyl group, provided that $R_1$ and $R_2$ are not simultaneously hydrogen atoms; $X^-$ represents a halogen ion, a sulfate ion, a sulfonate ion, an alkylsulfonate ion, an acetate ion, an alkylcarboxylate ion, or a phosphate ion; and n is an integer).

Examples of the compound represented by Formula (1) or (2) include diallylamine hydrochloride-sulfur dioxide copolymer PAS-92, methyldiallylamine hydrochloride-sulfur dioxide copolymer PAS-2201CL, and diallyldimethylammonium chloride-sulfur dioxide copolymer PAS-A-5 (these are manufactured by manufactured by Nittobo Medical Co., Ltd.). In the present invention, the compounds represented by Formula (1) can be particularly used. Furthermore, PAS-2201CL and PAS-A-5 are superior to PAS-92 in the effect of inhibiting the heat-induced yellowing of the recording medium.

The amount of the cationic polymer having a sulfonyl group contained in the first layer of the ink-receiving layer can be 0.2 parts by mass or more and 4.0 parts by mass or less, in particular, 0.5 parts by mass or more and 2.0 parts by mass or less, based on 100 parts by mass of the gas-phase method silica. Within this range, both the effect of improving the ozone resistance of an image and the effect of inhibiting cracking of the ink-receiving layer can be achieved at high levels.

Glycol

In the present invention, the term "glycol" refers to a compound having a structure in which a hydroxyl group is substituted on each of two carbon atoms of a linear or cyclic aliphatic hydrocarbon. Specific examples of the glycol include ethylene glycol, diethylene glycol, triethylene glycol, propylene glycol, dipropylene glycol, isoprene glycol, hexylene glycol, 1,3-butylene glycol, and 1,2-hexanediol.

The amount of the glycol contained in the first layer of the ink-receiving layer can be 2.0 parts by mass or more and 20.0 parts by mass or less based on 100 parts by mass of the cationic polymer having a sulfonyl group. In addition, the amount of the glycol contained in the first layer of the ink-receiving layer can be 2.0 parts by mass or more and 20.0 parts by mass or less, in particular, 5.0 parts by mass or more and 15.0 parts by mass or less, based on 100 parts by mass of the gas-phase method silica.

Polyvalent Metal

In the present invention, the ink-receiving layer can contain a polyvalent metal. In the present invention, the "polyvalent metal" includes the polyvalent metal in its ion form and the polyvalent metal in its salt form. Examples of the polyvalent metal include di- or more valent metals. Examples of the divalent metal include alkaline earth metals such as beryllium, magnesium, calcium, strontium, barium, zirconium, and radium. Examples of the trivalent metal include aluminum, yttrium, zirconium, iron, and other transition metals. In the present invention, such a polyvalent metal can be added to the coating solution for ink-receiving layer in a water-soluble salt form such as a hydroxide, a chloride, or a nitrate. Incidentally, in the present invention, the term "water-soluble" refers to that the solubility in water under ordinary temperature and ordinary pressure is 1 mass % or more.

In the present invention, among the water-soluble salts of the above-mentioned polyvalent metals, water-soluble salts of zirconium and aluminum can be particularly used. Specific examples of the water-soluble salts of zirconium include zirconium acetate, zirconium chloride, zirconium oxychloride, zirconium hydroxychloride, zirconium nitrate, basic zirconium carbonate, zirconium hydroxide, zirconium ammonium carbonate, zirconium potassium carbonate, zirconium sulfate, and zirconium fluoride. In particular, zirconium acetate can be used. Examples of the zirconium acetate include Zircosol ZA-30 (manufactured by Daiichi Kigenso Kagaku Kogyo Co., Ltd.). Examples of the water-soluble salt of aluminum include poly(aluminum chloride) (manufactured by Taki Chemical Co., Ltd.), poly(aluminum hydroxide) (manufactured by Asada Chemical Industry Co., Ltd.), and HAP-25 (manufactured by RIKENGREEN Co., Ltd.).

The amount of the polyvalent metal contained in the ink-receiving layer can be 0.1 parts by mass or more, in particular, 0.3 parts by mass or more, based on 100 parts by mass of the gas-phase method silica from the viewpoint of the ozone resistance of an image, and can be 10 parts by mass or less, in particular, 5 parts by mass or less, based on 100 parts by mass of the gas-phase method silica from the viewpoints of the ink-absorbing properties and the color development of an image.

Other Materials

In the present invention, the ink-receiving layer may contain other materials in addition to the above-described materials. Examples of such additional materials include pH adjusters, thickeners, fluidity modifiers, antifoaming agents, foam inhibitors, surfactants, release agents, penetrants, color pigments, color dyes, fluorescent brightening agents, ultraviolet absorbers, antioxidants, antiseptics, antifungal agents, water resistant additives, dye-fixing agents, hardening agents, and weather resistant materials.

Base

The base used in the recording medium of the present invention may be any base, and examples of usable base include paper such as fine paper, medium quality paper, coated paper, art paper, and cast-coated paper; synthetic paper; white plastic films; transparent plastic films; translucent plastic films; and resin-coated paper.

In order to achieve effective expression of the glossiness of an image, the base should have high barrier properties against the coating solution for forming the ink-receiving layer. Examples of such a base include white plastic films opacified by pore-introduction through addition of a pigment such as titanium oxide or barium sulfate to, for example, polyethylene terephthalate, polyvinyl chloride, polycarbonate, polyimide, polyacetate, polyethylene, polypropylene, or polystyrene; and resin-coated paper, i.e., base paper laminated with a thermosetting resin such as polyethylene or polypropylene.

In order to allow the recording medium to achieve image quality and texture equivalent to those of silver halide photography, the base paper used as the base can be polyolefin resin-coated paper where at least the surface on which the ink-receiving layer is provided is coated with a polyolefin resin, in particular, polyolefin resin-coated paper where the both surfaces are coated with a polyolefin resin. The polyolefin resin-coated paper can have a ten-point average roughness, measured in accordance with JIS-B0601, of 0.5 µm or less and a 60-degree specular glossiness, measured in accordance with JIS-Z-8741, of 25% or more and 75% or less.

The resin-coated paper can have any thickness, for example, a thickness of 25 µm or more and 500 µm or less. Resin-coated paper having a thickness of not less than 25 µm can effectively prevent the rigidity of the recording medium from decreasing and can effectively prevent occurrence of disadvantages such as degradations in the feel and texture when the recording medium is touched and a reduction in opacity. Resin-coated paper having a thickness of 500 µm or less can effectively prevent an increase in rigidity of the recording medium to avoid causing difficulty in handling and can smoothly feed paper in an ink-jet recording apparatus. The resin-coated paper can have a thickness of 50 µm or more and 300 µm or less. The resin coated paper can have any basis weight, for example, a basis weight of 25 $g/m^2$ or more and 500 $g/m^2$ or less.

Method of Producing Recording Medium

In the present invention, the recording medium may be produced by any method and can be produced, for example, by a method including a process of coating a base with a coating solution for an ink-receiving layer. The method of producing the recording medium will now be described.

Method of Producing Base

In the recording medium of the present invention, the base can be produced by a common process of producing paper. Examples of the papermaking machine include Fourdrinier paper machines, cylinder paper machines, drum paper machines, and twin wire paper machines.

The base of the recording medium of the present invention may be coated with a porous material, such as light calcium carbonate, heavy calcium carbonate, alumina, silica, or silicate, by a size press process, which is usually performed in papermaking. The coating may be performed by a common coating process. Specific examples of such a process include a coating technology using a device such as a gate roll coater, size press, bar coater, blade coater, air-knife coater, roll coater, blush coater, curtain coater, gravure coater, or spray equipment. The resulting base may be subjected to calender treatment, thermocalender treatment, or super calender treatment to smoothen the surface thereof.

Method of Forming Ink-Receiving Layer

In the recording medium of the present invention, an ink-receiving layer can be formed on a base, for example, by mixing gas-phase method silica, a binder, and optional other additives to prepare a coating solution, applying the coating solution onto the base, and drying it. In the present invention, two types of coating solutions are prepared. The coating solutions may be successively applied and dried (successive coating) or may be simultaneously applied (simultaneous multilayer coating). Specifically, for example, an ink-receiving layer is formed by applying onto a base a coating solution containing gas-phase method silica and a binder and (1) not containing any cationic polymer having a sulfonyl group or (2) containing a considerably small amount of a cationic polymer having a sulfonyl group, i.e., in an amount not higher than 0.1 parts by mass based on 100 parts by mass of the gas-phase method silica; and further applying thereon a coating solution containing gas-phase method silica, a binder, a cationic polymer having a sulfonyl group, and glycol. Alternatively, the ink-receiving layer may be formed by simultaneously applying onto a base a coating solution containing gas-phase method silica and a binder and (1) not containing any cationic polymer having a sulfonyl group or (2) containing a considerably small amount of a cationic polymer having a sulfonyl group, i.e., in an amount not higher than 0.1 parts by mass based on 100 parts by mass of the gas-phase method silica and a coating solution containing gas-phase method silica, a binder, a cationic polymer having a sulfonyl group, and glycol. In particular, simultaneous multilayer coating, such as slide bead coating or slide curtain coating, shows high productivity. The coating amount of the coating solution can be 5 $g/m^2$ or more and 45 $g/m^2$ or less in terms of dried solid content. An application amount of 5 $g/m^2$ or more can provide good ink-absorbing properties. An application amount of 45 $g/m^2$ or less can prevent occurrence of cockling. After the formation of the ink-receiving layer, the surface of the recording medium may be smoothened by calender treatment, thermocalender treatment, or super calender treatment.

EXAMPLES

The present invention will now be more specifically described by reference examples, examples, and comparative examples, but is not limited by the following examples, within the scope of the present invention. In the following examples, the term "part(s)" is on a mass basis unless otherwise specified.

Reference Example 1

Production of Base

A base was produced under the following conditions. Paper stuff of the following composition was prepared with water so as to have a solid content of 3 mass %.

Paper Stuff Composition:

| | |
|---|---|
| Pulp<br>(80 parts of broadleaf tree bleached kraft pulp (LBKP)<br>having a freeness of 450 mL CSF (Canadian Standard<br>Freeness) and 20 parts of needle-leaf bleached kraft pulp<br>(NBKP)<br>having a freeness of 480 mL CSF) | 100 parts |
| Cationized starch | 0.60 parts |
| Heavy calcium carbonate | 10 parts |
| Light calcium carbonate | 15 parts |
| Alkyl ketene dimer | 0.10 parts |
| Cationic polyacrylamide | 0.03 parts |

The resulting paper stuff was formed into a sheet with a Fourdrinier paper machine, and the sheet was subjected to three-stage wet pressing, followed by drying with a multi-cylinder dryer. The resulting sheet was impregnated with an aqueous oxidized starch solution in a coating amount of 1.0 g/m² using a size press apparatus and was dried, followed by finishing with a machine calender to give base paper having a basis weight of 170 g/m², a stockigt sizing degree of 100 seconds, an air permeability of 50 seconds, a Bekk smoothness of 30 seconds, and a Gurley stiffness of 11.0 mN.

Onto the resulting base paper, a resin composition composed of 70 parts of low-density polyethylene, 20 parts of high-density polyethylene, and 10 parts of titanium oxide was applied in an amount of 25 g/m². Onto the back surface of the base paper, a resin composition composed of 50 parts of high-density polyethylene and 50 parts of low-density polyethylene was applied in an amount of 25 g/m² to give a resin-coated base.

Preparation of Gas-Phase Method Silica Sol A

To 79.23 parts of deionized water added was 1.54 parts of poly(diallyldimethylamine hydrochloride) (SHALLOL DC902P, manufactured by Daiichi Kogyo Seiyaku Co., Ltd., solid content: 50 mass %). 19.23 parts of gas-phase method silica (AEROSIL 300, manufactured by EVONIK Industries A.G.) was gradually added to the resulting aqueous cationic polymer solution (the amount of poly(diallyldimethylamine hydrochloride) is 4 parts by mass based on 100 parts by mass of gas-phase method silica in terms of solid content) with stirring with a T.K. homomixer (model: MARK II 2.5, manufactured by Tokusyu Kika Kogyo Co., Ltd.) at 3000 rpm. Furthermore, treatment with a Nanomizer (manufactured by Yoshida Kikai Co., Ltd.) was performed twice to prepare gas-phase method silica sol A having a solid content of 20 mass %.

Preparation Binder Solution

Polyvinyl alcohol (PVA 235, manufactured by Kuraray Co., Ltd., viscosity average polymerization degree: 3500, saponification degree: 88 mol %) was dissolved in deionized water to give a binder solution having a solid content of 8.0 mass %.

Preparation of Coating Solution 1 for Ink-Receiving Layer

A cationic polymer having a sulfonyl group (diallyldimethylammonium chloride-sulfur dioxide copolymer, PAS-A-5, manufactured by Nittobo Medical Co., Ltd., solid content: 40 mass %), a water-soluble salt of a polyvalent metal (zirconium acetate, ZA-30, manufactured by Daiichi Kigenso Kagaku Kogyo Co., Ltd., solid content: 30 mass %), and an aqueous binder solution were mixed with gas-phase method silica sol A in amounts of 1.0 part, 2.0 parts, and 20.0 parts, respectively, in terms of solid content, based on 100 parts of the gas-phase method silica solid content contained in gas-phase method silica sol A to give a mixture solution. Subsequently, a crosslinking agent (aqueous orthoboric acid solution, solid content: 5 mass %) was mixed with the resulting mixture solution in an amount of 20.0 parts, in terms of solid content, based on 100 parts of the polyvinyl alcohol solid content contained in the mixture solution. Furthermore, a surfactant (Surfinol 465, manufactured by Nissin Chemical Co., Ltd.) was added thereto in an amount of 0.1 mass % based on the total mass of the coating solution to give coating solution 1 for ink-receiving layer.

Preparation of Coating Solution 2 for Ink-Receiving Layer

Coating solution 2 for ink-receiving layer was prepared as in "Preparation of coating solution 1 for ink-receiving layer" except that coating solution 2 did not contain the cationic polymer having a sulfonyl group (diallyldimethylammonium chloride-sulfur dioxide copolymer, PAS-A-5).

Production of Recording Medium

The coating solutions 1 and 2 for ink-receiving layer was applied onto the base produced above to form a layer of coating solution 2 for ink-receiving layer having a dried thickness of 40 μm and a layer of coating solution 1 for ink-receiving layer having a dried thickness of 25 μm in this order from the base side with a multilayer slide hopper coating machine, followed by drying at 60° C. to produce a recording medium of Reference Example 1.

Examples 1 to 3

Recording media of Examples 1 to 3 were produced as in Reference Example 1 except that propylene glycol as the glycol was further mixed with the gas-phase method silica sol A in "Preparation of coating solution 1 for ink-receiving layer" in Reference Example 1 in amounts of 2.0 parts, 10.0 parts, and 20.0 parts, respectively, in terms of solid content, based on 100 parts of gas-phase method silica solid content contained in the gas-phase method silica sol A.

Example 4

A recording medium of Example 4 was produced as in Reference Example 1 except that ethylene glycol as the glycol was further mixed with the gas-phase method silica sol A in "Preparation of coating solution 1 for ink-receiving layer" in Reference Example 1 in an amount of 10.0 parts, in terms of solid content, based on 100 parts of gas-phase method silica solid content contained in the gas-phase method silica sol A.

Example 5

A recording medium of Example 5 was produced as in Reference Example 1 except that 1,2-hexanediol as the glycol was further mixed with the gas-phase method silica sol A in "Preparation of coating solution 1 for ink-receiving layer" in Reference Example 1 in an amount of 10.0 parts, in terms of solid content, based on 100 parts of gas-phase method silica solid content contained in the gas-phase method silica sol A.

Example 6

A recording medium of Example 6 was produced as in Reference Example 1 except that isopropanol was further mixed with the gas-phase method silica sol A in "Preparation of coating solution 1 for ink-receiving layer" in Reference Example 1 in an amount of 10.0 parts, in terms of solid content, based on 100 parts of gas-phase method silica solid content contained in the gas-phase method silica sol A.

Example 7

A recording medium of Example 7 was produced as in Reference Example 1 except that malonic acid was further mixed with the gas-phase method silica sol A in "Preparation of coating solution 1 for ink-receiving layer" in Reference Example 1 in an amount of 10.0 parts, in terms of solid content, based on 100 parts of gas-phase method silica solid content contained in the gas-phase method silica sol A.

Example 8

A recording medium of Example 8 was produced as in Reference Example 1 except that 1.0 part of a methyldiallylamine hydrochloride-sulfur dioxide copolymer (PAS-2201CL, manufactured by Nittobo Medical Co., Ltd., solid content: 25 mass %) was used in place of 1.0 part of the cationic polymer having a sulfonyl group (diallyldimethylammonium chloride-sulfur dioxide copolymer, PAS-A-5) in "Preparation of coating solution 1 for ink-receiving layer" in Reference Example 1.

Example 9

A recording medium of Example 9 was produced as in Reference Example 1 except that 1.0 part of a diallylmethylethylammonium ethylsulfate-sulfur dioxide copolymer (PAS-2401, manufactured by Nittobo Medical Co., Ltd., solid content: 25 mass %) was used in place of 1.0 part of the cationic polymer having a sulfonyl group (diallyldimethylammonium chloride-sulfur dioxide copolymer, PAS-A-5) in "Preparation of coating solution 1 for ink-receiving layer" in Reference Example 1.

Example 10

A recording medium of Example 10 was produced as in Reference Example 1 except that 1.0 part of a diallylamine hydrochloride-sulfur dioxide copolymer (PAS-92, manufactured by Nittobo Medical Co., Ltd., solid content: 20 mass %) was used in place of 1.0 part of the cationic polymer having a sulfonyl group (diallyldimethylammonium chloride-sulfur dioxide copolymer, PAS-A-5) in "Preparation of coating solution 1 for ink-receiving layer" in Reference Example 1.

Examples 11 to 14

Recording media of Examples 11 to 14 were produced as in Reference Example 1 except that the amounts of the cationic polymer having a sulfonyl group (diallyldimethylammonium chloride-sulfur dioxide copolymer, PAS-A-5) in "Preparation of coating solution 1 for ink-receiving layer" in Reference Example 1 were 0.2 parts, 0.5 parts, 2.0 parts, and 4.0 parts, respectively.

Example 15

A recording medium of Example 15 was produced as in Example 2 except that the coating solutions 1 and 2 for ink-receiving layer were applied to form layers having dried thicknesses of 5 µm and 35 µm, respectively, in "Production of recording medium" in Example 2.

Example 16

A recording medium of Example 16 was produced as in Example 2 except that the coating solutions 1 and 2 for ink-receiving layer were applied to form layers having dried thicknesses of 10 µm and 30 µm, respectively, in "Production of recording medium" in Example 2.

Example 17

A recording medium of Example 17 was produced as in Example 2 except that the coating solutions 1 and 2 for ink-receiving layer were applied to form layers having dried thicknesses of 25 µm and 15 µm, respectively, in "Production of recording medium" in Example 2.

Example 18

A recording medium of Example 18 was produced as in Example 2 except that the coating solutions 1 and 2 for ink-receiving layer were applied to form layers having dried thicknesses of 30 µm and 10 µm, respectively, in "Production of recording medium" in Example 2.

Example 19

A recording medium of Example 19 was produced as in Example 2 except that a coating solution composed of colloidal silica (Quotron PL-3L, manufactured by Fuso Chemical Co., Ltd., solid content: 20%) and highly basic poly(aluminum chloride) (HAP25, manufactured by RIKENGREEN Co., Ltd., solid content: 25%) at a solid content mass ratio of 100:10 was further coated on the recording medium produced in Example 2 to form a layer having a dried thickness 0.2 µm using a bar coater.

Example 20

A recording medium of Example 20 was produced as in Reference Example 1 except that propylene glycol as the glycol was further added to the gas-phase method silica sol A in "Preparation of coating solution 1 for ink-receiving layer" in Reference Example 1 in an amount of 10.0 parts, in terms of solid content, based on 100 parts of gas-phase method silica solid content contained in the gas-phase method silica sol A and that a cationic polymer having a sulfonyl group (diallyldimethylammonium chloride-sulfur dioxide copolymer, PAS-A-5) was further added to the gas-phase method silica sol A in "Preparation of coating solution 2 for ink-receiving layer" in an amount of 0.1 part, in terms of solid content, based on 100 parts of gas-phase method silica solid content.

Comparative Example 1

A recording medium of Comparative Example 1 was produced as in Reference Example 1 except that the cationic polymer having a sulfonyl group (diallyldimethylammonium chloride-sulfur dioxide copolymer, PAS-A-5) in "Preparation of coating solution 1 for ink-receiving layer" in Reference Example 1 was not used.

Comparative Example 2

A recording medium of Comparative Example 2 was produced as in Example 2 except that the cationic polymer having a sulfonyl group (diallyldimethylammonium chloride-sulfur dioxide copolymer, PAS-A-5) in "Preparation of coating solution 1 for ink-receiving layer" in Example 2 was not used.

Comparative Example 3

A recording medium of Comparative Example 3 was produced as in Comparative Example 1 except that a layer of coating solution 1 for ink-receiving layer and a layer of coating solution 2 for ink-receiving layer were formed in this order from the base side so as to have dried thicknesses of 25 µm and 15 µm, respectively, in "Production of recording medium" in Reference Example 1.

Comparative Example 4

A recording medium of Comparative Example 4 was produced as in Example 9 except that a layer of coating solution 1 for ink-receiving layer and a layer of coating solution 2 for ink-receiving layer were formed in this order from the base side so as to have dried thicknesses of 25 µm and 15 µm, respectively, in "Production of recording medium" in Example 9.

Comparative Example 5

A recording medium of Comparative Example 5 was produced as in Example 2 except that a layer of coating solution 1 for ink-receiving layer and a layer of coating solution 2 for ink-receiving layer were formed in this order from the base side so as to have dried thicknesses of 25 µm and 15 µm, respectively, in "Production of recording medium" in Example 2.

Comparative Example 6

A recording medium of Comparative Example 6 was produced as in Example 2 except that two layers of coating solution 1 for ink-receiving layer were formed so as to have dried thicknesses of 25 µm and 15 µm in this order from the base side in "Production of recording medium" in Example 2.

Comparative Example 7

A recording medium of Comparative Example 7 was produced as in Example 2 except that 1.0 part of a cationic polymer not having a sulfonyl group (poly(diallyldimethylamine hydrochloride), Shallol DC902P, manufactured by Daiichi Kogyo Seiyaku Co., Ltd., solid content: 50 mass %) was used in place of 1.0 part of the cationic polymer having a sulfonyl group (diallyldimethylammonium chloride-sulfur dioxide copolymer, PAS-A-5) in "Preparation of coating solution 1 for ink-receiving layer" in Example 2.

Comparative Example 8

A recording medium of Comparative Example 8 was produced as in Example 2 except that 1.0 part of a cationic polymer not having a sulfonyl group (poly(allylamine hydrochloride), PAA-HCL-05, manufactured by Nittobo Medical Co., Ltd., solid content: 40 mass %) was used in place of 1.0 part of the cationic polymer having a sulfonyl group (diallyldimethylammonium chloride-sulfur dioxide copolymer, PAS-A-5) in "Preparation of coating solution 1 for ink-receiving layer" in Example 2.

Comparative Example 9

A recording medium of Comparative Example 9 was produced as in Example 2 except that 1.0 part of a cationic polymer not having a sulfonyl group (poly(methyldiallylamine), PAS-M-1, manufactured by Nittobo Medical Co., Ltd., solid content: 50 mass %) was used in place of 1.0 part of the cationic polymer having a sulfonyl group (diallyldimethylammonium chloride-sulfur dioxide copolymer, PAS-A-5) in "Preparation of coating solution 1 for ink-receiving layer" in Example 2.

Comparative Example 10

A recording medium of Comparative Example 10 was produced as in Example 2 except that 1.0 part of a cationic polymer not having a sulfonyl group (diallyldimethylammonium chloride-acrylamide copolymer, PAS-J-81, manufactured by Nittobo Medical Co., Ltd., solid content: 25 mass %) was used in place of 1.0 part of the cationic polymer having a sulfonyl group (diallyldimethylammonium chloride-sulfur dioxide copolymer, PAS-A-5) in "Preparation of coating solution 1 for ink-receiving layer" in Example 2.

Table 1 shows the compositions of ink-receiving layers of the recording media produced above. The abbreviations in Table 1 are as those shown in the description of the method of producing each recording medium.

TABLE 1

| | Composition of ink-receiving layer of recording medium | | | | | | |
|---|---|---|---|---|---|---|---|
| | Second layer adjacent to support | | | | | First layer not adjacent to support | |
| | | Cationic polymer | | Glycols, etc. | | | |
| Example No. | Thickness (µm) | Type | Content (parts by mass) | Type | Content (parts by mass) | Thickness (µm) | Cationic polymer Type |
| Example 1 | 25 | — | — | — | — | 15 | PAS-A-5 |
| Example 2 | 25 | — | — | — | — | 15 | PAS-A-5 |
| Example 3 | 25 | — | — | — | — | 15 | PAS-A-5 |
| Example 4 | 25 | — | — | — | — | 15 | PAS-A-5 |
| Example 5 | 25 | — | — | — | — | 15 | PAS-A-5 |
| Example 6 | 25 | — | — | — | — | 15 | PAS-A-5 |
| Example 7 | 25 | — | — | — | — | 15 | PAS-A-5 |
| Example 8 | 25 | — | — | — | — | 15 | PAS-2201CL |
| Example 9 | 25 | — | — | — | — | 15 | PAS-2401 |
| Example 10 | 25 | — | — | — | — | 15 | PAS-92 |
| Example 11 | 25 | — | — | — | — | 15 | PAS-A-5 |
| Example 12 | 25 | — | — | — | — | 15 | PAS-A-5 |

TABLE 1-continued

| | | Composition of ink-receiving layer of recording medium | | | | | |
|---|---|---|---|---|---|---|---|
| Example 13 | 25 | — | — | — | — | 15 | PAS-A-5 |
| Example 14 | 25 | — | — | — | — | 15 | PAS-A-5 |
| Example 15 | 35 | — | — | — | — | 5 | PAS-A-5 |
| Example 16 | 30 | — | — | — | — | 10 | PAS-A-5 |
| Example 17 | 15 | — | — | — | — | 25 | PAS-A-5 |
| Example 18 | 10 | — | — | — | — | 30 | PAS-A-5 |
| Example 19 | 25 | — | — | — | — | 15 | PAS-A-5 |
| Example 20 | 25 | PAS-A-5 | 0.1 | — | — | 15 | PAS-A-5 |
| Comp. Ex. 1 | 25 | — | — | — | — | 15 | — |
| Comp. Ex. 2 | 25 | — | — | — | — | 15 | — |
| Comp. Ex. 3 | 25 | PAS-A-5 | 1.0 | — | — | 15 | — |
| Comp. Ex. 4 | 25 | PAS-A-5 | 1.0 | propylene glycol | 10.0 | 15 | — |
| Comp. Ex. 5 | 25 | PAS-92 | 1.0 | propylene glycol | 10.0 | 15 | — |
| Comp. Ex. 6 | 25 | PAS-A-5 | 1.0 | propylene glycol | 10.0 | 15 | PAS-A-5 |
| Comp. Ex. 7 | 25 | — | — | — | — | 15 | DC-902P |
| Comp. Ex. 8 | 25 | — | — | — | — | 15 | PAA-HCl-05 |
| Comp. Ex. 9 | 25 | — | — | — | — | 15 | PAS-M-1 |
| Comp. Ex. 10 | 25 | — | — | — | — | 15 | PAS-J-81 |

| | First layer not adjacent to support | | | | Third layer | |
|---|---|---|---|---|---|---|
| | Cationic polymer | Glycols, etc. | | | | |
| Example No. | Content (parts by mass) | Type | Content (parts by mass) | Thickness (μm) | Type | |
| Example 1 | 1.0 | propylene glycol | 2.0 | — | — | |
| Example 2 | 1.0 | propylene glycol | 10.0 | — | — | |
| Example 3 | 1.0 | propylene glycol | 20.0 | — | — | |
| Example 4 | 1.0 | ethylene glycol | 10.0 | — | — | |
| Example 5 | 1.0 | 1,2-hexanediol | 10.0 | — | — | |
| Example 6 | 1.0 | isopropanol | 10.0 | — | — | |
| Example 7 | 1.0 | malonic acid | 10.0 | — | — | |
| Example 8 | 1.0 | propylene glycol | 10.0 | — | — | |
| Example 9 | 1.0 | propylene glycol | 10.0 | — | — | |
| Example 10 | 1.0 | propylene glycol | 10.0 | — | — | |
| Example 11 | 0.2 | propylene glycol | 10.0 | — | — | |
| Example 12 | 0.5 | propylene glycol | 10.0 | — | — | |
| Example 13 | 2.0 | propylene glycol | 10.0 | — | — | |
| Example 14 | 4.0 | propylene glycol | 10.0 | — | — | |
| Example 15 | 1.0 | propylene glycol | 10.0 | — | — | |
| Example 16 | 1.0 | propylene glycol | 10.0 | — | — | |
| Example 17 | 1.0 | propylene glycol | 10.0 | — | — | |
| Example 18 | 1.0 | propylene glycol | 10.0 | — | — | |
| Example 19 | 1.0 | propylene glycol | 10.0 | 0.2 | PL-3L/HAP25 | |
| Example 20 | 1.0 | propylene glycol | 10.0 | — | — | |
| Comp. Ex. 1 | — | — | — | — | — | |
| Comp. Ex. 2 | — | propylene glycol | 10.0 | — | — | |
| Comp. Ex. 3 | — | — | — | — | — | |
| Comp. Ex. 4 | — | — | — | — | — | |
| Comp. Ex. 5 | — | — | — | — | — | |
| Comp. Ex. 6 | 1.0 | propylene glycol | 10.0 | — | — | |
| Comp. Ex. 7 | 1.0 | propylene glycol | 10.0 | — | — | |
| Comp. Ex. 8 | 1.0 | propylene glycol | 10.0 | — | — | |
| Comp. Ex. 9 | 1.0 | propylene glycol | 10.0 | — | — | |
| Comp. Ex. 10 | 1.0 | propylene glycol | 10.0 | — | — | |

Evaluation

In the present invention, A to C in the evaluation criteria of each evaluation item are acceptable levels, and D and E are unacceptable levels. Incidentally, each evaluation was performed using an ink-jet recording apparatus, PIXUS MP990 (manufactured by CANON KABUSHIKI KAISHA) equipped with an ink cartridge BCI-321 (manufactured by CANON KABUSHIKI KAISHA). The recording conditions were a temperature of 23° C. and a relative humidity of 50%. In the ink-jet recording apparatus, an image recorded under conditions of a resolution of 600×600 dpi and application of one ink drop of about 11 ng to a unit region of 1/600×1/600 inch is defined as a recording duty of 100%.

Effect of Inhibiting Cracking of Ink-Receiving Layer

The ink-receiving layer surface of each recording media produced above was visually observed to evaluate the effect of inhibiting cracking of the ink-receiving layer. The evaluation criteria are as follows:

A: no cracking was observed,
B: slight cracking was observed,
C: though cracking partially occurred, but it was not noticeable,
D: cracking was observed in the whole area, and
E: large cracking was observed, and the ink-receiving layer partially detached from the base.

The evaluation results are shown in Table 2.

Ozone Resistance of Image

A black patch (2.5×2.5 cm) was recorded on each recording medium produced above at an optical density of 1.0±0.1 using the ink-jet recording apparatus set to the mode of "luster pro platinum grade". The resulting image was placed in an ozone exposure tester OMS-H (manufactured by Suga Test Instruments Co., Ltd.) and was exposed to 2.5 ppm of ozone at a temperature of 23° C. and a relative humidity of 50% for 100 hours. The optical densities of the black patch before and after the exposure test were measured with a spectrophotometer Spectrolino (manufactured by Gretag Macbeth A.G.), and the density residual ratio of each of the cyan, magenta, and yellow components was calculated by the following Expression:

Density residual ratio(%)=(image density after test/image density before test)×100

The ozone resistance of each image was evaluated on the basis of the density residual ratio of the cyan component, which was judged, from the density residual ratios, to be mostly affected by ozone. Incidentally, a larger density residual ratio means higher ozone resistance of an image. The evaluation criteria are as follows:

A: the density residual ratio of cyan component was 82% or more,
B: the density residual ratio of cyan component was 79% or more and less than 82%,
C: the density residual ratio of cyan component was 76% or more and less than 79%,
D: the density residual ratio of cyan component was 73% or more and less than 76%, and
E: the density residual ratio of cyan component was less than 73%.

The evaluation results are shown in Table 2.

Bronze Resistance of Image

A cyan solid image (an image of a recording duty of 100%) of 2.5×2.5 cm was recorded on each recording medium produced above using the ink-jet recording apparatus set to the mode of "luster pro platinum grade, no color correction". The bronze resistance of the resulting image was evaluated by visually observing the image. The evaluation criteria are as follows:

A: no bronze was observed,
B: very slight reddish bronze was observed,
C: slight reddish bronze was observed, but it was not noticeable,
D: reddish bronze was observed, and
E: metallic luster bronze was observed.

The evaluation results are shown in Table 2.

Effect of inhibiting heat-induced yellowing of recording medium

Each recording medium produced above was stored under high temperature conditions, a temperature of 90° C. and a relative humidity of 50%, for 48 hours. The blank portion of the recording medium was measured for the L* values, a* values, and b* values before and after the storage test with a spectrophotometer Spectrolino (manufactured by Gretag Macbeth A.G.), and ΔE was calculated by the following Expression:

$$\Delta E = [\{(L^*\text{value of recorded matter before test}) - (L^*\text{value of recorded matter after test})\}^2 + \{(a^*\text{value of recorded matter before test}) - (a^*\text{value of recorded matter after test})\}^2 + \{(b^*\text{value of recorded matter before test}) - (b^*\text{value of recorded matter after test})\}^2]^{1/2}$$

The effect of inhibiting the heat-induced yellowing of the recording medium was evaluated from the resulting ΔE. Incidentally, a smaller ΔE means that the heat-induced yellowing of the recording medium is more inhibited. The evaluation criteria are as follows:

A: ΔE was less than 2.3,
B: ΔE was 2.3 or more and less than 2.6,
C: ΔE was 2.6 or more and less than 2.9,
D: ΔE was 2.9 or more and less than 3.2, and
E: ΔE was 3.2 or more.

The evaluation results are shown in Table 2.

TABLE 2

| | Evaluation results | | | |
|---|---|---|---|---|
| Example No. | Effect of inhibiting cracking of ink-receiving layer | Ozone resistance of image | Bronze resistance of image | Effect of inhibiting heat-induced yellowing of recording medium |
| Example 1 | A | A | C | A |
| Example 2 | A | A | A | A |
| Example 3 | C | A | A | A |
| Example 4 | B | A | A | A |
| Example 5 | C | A | A | A |
| Example 6 | B | A | C | A |
| Example 7 | C | A | C | A |
| Example 8 | A | A | A | A |
| Example 9 | A | A | A | A |
| Example 10 | A | A | A | C |
| Example 11 | B | C | A | A |
| Example 12 | B | B | A | A |
| Example 13 | B | A | B | A |
| Example 14 | A | A | C | A |
| Example 15 | A | C | A | A |
| Example 16 | A | B | A | A |
| Example 17 | B | A | A | A |
| Example 18 | C | A | A | A |
| Example 19 | A | A | A | A |
| Example 20 | A | A | A | A |
| Comparative Example 1 | A | E | A | A |
| Comparative Example 2 | A | E | A | A |
| Comparative Example 3 | D | D | B | A |
| Comparative Example 4 | E | D | A | A |
| Comparative Example 5 | E | D | A | D |
| Comparative Example 6 | E | A | A | A |
| Comparative Example 7 | A | D | D | A |
| Comparative Example 8 | A | D | C | E |
| Comparative Example 9 | A | D | C | A |
| Comparative Example 10 | A | D | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-086534 filed Apr. 5, 2012, which is hereby incorporated by reference herein in its entirety.

What is claimed is:

1. A recording medium comprising a base, a second ink-receiving layer, and a first ink-receiving layer in this order, wherein
the first ink-receiving layer comprises gas-phase method silica, a binder, a cationic polymer having a sulfonyl group, and glycol; and
the second ink-receiving layer comprises gas-phase method silica and a binder and (1) does not comprise any cationic polymer having a sulfonyl group or (2) comprises a cationic polymer having a sulfonyl group in an amount not higher than 0.1 parts by mass based on 100 parts by mass of the gas-phase method silica.

2. The recording medium according to claim 1, wherein the content of the glycol in the first ink-receiving layer is 2.0 parts by mass or more and 20.0 parts by mass or less based on 100 parts by mass of the cationic polymer having a sulfonyl group.

3. The recording medium according to claim 1, wherein the cationic polymer having a sulfonyl group comprises a compound represented by the following Formula (1):

[Chem. 1]

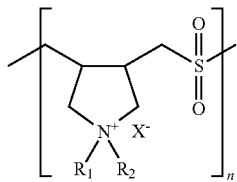

Formula (1)

(in Formula (1), $R_1$ and $R_2$ each represent a hydrogen atom or an alkyl group, provided that $R_1$ and $R_2$ are not simultaneously hydrogen atoms; $X^-$ represents a halogen ion, a sulfate ion, a sulfonate ion, an alkylsulfonate ion, an acetate ion, an alkylcarboxylate ion, or a phosphate ion; and n is an integer).

4. The recording medium according to claim 1, wherein the content of the cationic polymer having a sulfonyl group in the first ink-receiving layer is 0.2 parts by mass or more and 4.0 parts by mass or less based on 100 parts by mass of the gas-phase method silica.

5. The recording medium according to claim 1, wherein the content of the glycol in the first ink-receiving layer is 2.0 parts by mass or more and 20.0 parts by mass or less based on 100 parts by mass of the gas-phase method silica.

6. A method of producing a recording medium according to claim 1, the method comprising:
applying onto a base a coating solution containing gas-phase method silica and a binder and (1) not containing any cationic polymer having a sulfonyl group or (2) containing a cationic polymer having a sulfonyl group in an amount not higher than 0.1 parts by mass based on 100 parts by mass of the gas-phase method silica; and
applying onto the applied coating solution another coating solution containing gas-phase method silica, a binder, a cationic polymer having a sulfonyl group, and glycol.

7. A method of producing a recording medium according to claim 1, the method comprising:
simultaneously applying two coating solutions onto a base, wherein
one coating solution contains gas-phase method silica and a binder and (1) does not contain any cationic polymer having a sulfonyl group or (2) contains a cationic polymer having a sulfonyl group in an amount not higher than 0.1 parts by mass based on 100 parts by mass of the gas-phase method silica; and
the other coating solution contains gas-phase method silica, a binder, a cationic polymer having a sulfonyl group, and glycol.

* * * * *